(12) United States Patent
Kang

(10) Patent No.: US 9,645,439 B2
(45) Date of Patent: May 9, 2017

(54) WIRE GRID POLARIZER AND METHOD FOR FABRICATING THEREOF, LIQUID CRYSTAL DISPLAY PANEL AND LIQUID CRYSTAL DISPLAY DEVICE HAVING THE SAME

(75) Inventor: Shinill Kang, Seoul (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 123 days.

(21) Appl. No.: 13/531,513

(22) Filed: Jun. 23, 2012

(65) Prior Publication Data

US 2013/0300986 A1    Nov. 14, 2013

(30) Foreign Application Priority Data

May 11, 2012    (KR) .................. 10-2012-0049984

(51) Int. Cl.
  *G02F 1/1335*    (2006.01)
  *G02B 5/30*    (2006.01)

(52) U.S. Cl.
  CPC ..... *G02F 1/133533* (2013.01); *G02B 5/3058* (2013.01); *G02F 2001/133548* (2013.01); *G02F 2202/36* (2013.01); *Y10T 29/49124* (2015.01)

(58) Field of Classification Search
  CPC ............. G02B 5/3058; G02F 1/133533; G02F 2001/133548
  See application file for complete search history.

(56) References Cited

U.S. PATENT DOCUMENTS

| | | | |
|---|---|---|---|
| 7,375,887 B2 * | 5/2008 | Hansen et al. ........... | 359/485.05 |
| 8,587,751 B2 * | 11/2013 | Kim et al. ..................... | 349/106 |
| 2006/0262250 A1 * | 11/2006 | Hobbs .................. | G02B 5/1809 349/96 |
| 2009/0190072 A1 * | 7/2009 | Nagata et al. .................. | 349/96 |
| 2009/0290105 A1 * | 11/2009 | Takada ............. | G02F 1/133528 349/96 |

FOREIGN PATENT DOCUMENTS

| KR | 10-2005-0105383 A | 11/2005 |
|---|---|---|
| KR | 10-2007-0010472 A | 1/2007 |
| KR | 10-2007-0101814 A | 10/2007 |

\* cited by examiner

*Primary Examiner* — Paisley L Arendt
(74) *Attorney, Agent, or Firm* — LRK Patent Law Firm

(57) ABSTRACT

A wire grid polarizer capable of improving light efficiency by applying a nano-wire grid pattern optimized to a LCD panel, a method of manufacturing thereof, and a liquid crystal display panel and a liquid crystal display device provided with the wire grid polarizer are provided. The wire grid polarizer of the present invention has a plurality of areas, and a shape of a wire grid pattern of an area among the plurality of areas is different from those of the other areas.

23 Claims, 16 Drawing Sheets

WIRE GRID POLARIZER AND METHOD FOR FABRICATING THEREOF, LIQUID CRYSTAL DISPLAY PANEL AND LIQUID CRYSTAL DISPLAY DEVICE HAVING THE SAME

BACKGROUND OF THE INVENTION

Field of the Invention

The present invention relates to a wire grid polarizer capable of improving light efficiency by applying a nano-wire grid pattern optimized to a LCD panel, a method of manufacturing thereof, and a liquid crystal display panel and a liquid crystal display device provided with the wire grid polarizer.

Background of the Related Art

Generally, a liquid crystal display (LCD) device is an electronic element which converts various kinds of electrical information generated by a variety of apparatuses into visual information using changes in transmittance of liquid crystal depending on an applied voltage.

Since the LCD device is advantageous in miniaturization, lightweightness and low power consumption, it is spotlighted as an alternative means that can overcome disadvantages of cathode ray tubes (CRTs) widely used in the past and is currently mounted on most of information processing devices that need a display device.

FIG. 1 is a view showing the structure of a conventional LCD device, in which the LCD device 10 includes a thin film transistor (TFT) substrate 11 formed with a gate line, a data line, TFTs and pixel electrodes, a color filter substrate 12 disposed to be opposite to the TFT substrate 11 and formed with a color filter and a common electrode, and a liquid crystal layer 13 filled between the TFT substrate 11 and the color filter substrate 12.

The TFT substrate 11 is a transparent glass substrate formed with thin film transistors on a matrix, in which the data line is connected to the source terminal, and the gate line is connected to the gate terminal. In addition, the pixel electrodes 11a made of transparent indium tin oxide (ITO), which is a conductive material, are formed at the drain terminal. The color filter substrate 12 is disposed over the TFT substrate 11 to face the TFT substrate 11. The color filter substrate 12 is a substrate on which R, G, and B pixels, which are color pixels emitting a certain color when light passes through, are formed through a thin film process, and the common electrode 12a made of ITO is formed on the front side thereof. In addition, polarizing plates 16 and 17 for polarizing unpolarized light supplied by a light source into linearly polarized light are provided under and on the TFT substrate 11 and the color filter substrate 12, respectively. The polarizing plates 16 and 17 maintain a penetrating direction of light to be constant depending on the alignment direction of the liquid crystal layer 13, and a reflective polarizing plate (DBEF or WGP) 20 that can enhance reusability of light by passing light of a specific polarizing direction and reflecting light of other polarizing directions is provided in addition to the polarizing plates 16 and 17.

Meanwhile, since the liquid crystal provided in the liquid crystal layer 13 is a light receiving element, the LCD device 100 needs a part which provides light separately. A backlight unit 18 is separately formed on the rear side of the TFT substrate 11 in order to provide the light. A lamp for providing light, a light guide plate for evenly distributing the light on all over the substrate, and other films are formed in the backlight unit 18.

The LCD device 10 configured as described above does not pass all the light provided by the backlight unit 18, and thus brightness is very important. A variety of films are developed and used in order to improve brightness of the LCD device 10, and a typical example thereof is a reflective polarizing film (polarizing plate).

Recently, such a reflective polarizing film takes an important role in the display industry, which is one of national core industries. There are various kinds of reflective polarizing films, and a dual brightness enhancement film (DBEF) or a diffusive reflective polarization film (DRPF) are typical examples thereof. The DBEF is a film where isotropic films and anisotropic films are repeatedly formed to have a stacked structure of hundreds of layers (about six hundreds or more layers). The light passing through the film is increased in total when the light passes through and is reflected in the stacked structure of hundreds or more layers, and thus brightness of the LCD device is improved. On the other hand, the DRPF is formed with another material having a refractive index different from that of the DRPF, and thus light passing through the film is increased since the light is reflected and refracted by the material.

Since the DBEF has the highest brightness improvement ratio among the reflective polarizing films, the DBEF is advantageous in enhancing characteristics of light efficiency when it is applied to a LCD device. However, since such a DBEF cannot be regarded as a complete polarizer element and a stacked structure of hundreds of thin film layers should be formed in manufacturing the DBEF, the manufacturing process is complicated, and the manufacturing cost is very high, and thus the DBEF is difficult to be used in a low price LCD device.

Accordingly, as is shown in Korean Laid-open Patent No. 10-2007-0101814, use of a wire grid polarizer (WGP) is proposed recently as a substitute for the DBEF, in which the WGP is a polarizer element which passes light of a specific polarizing direction and reuses light of the other polarizing directions by reflecting the light. Since such a wire grid polarizer has a high polarization splitting performance compared with those of the other polarizer, it can be advantageously used as a reflective polarizer.

FIGS. 2 and 3 are a perspective view and a side view showing a conventional wire grid polarizer (WGP). As shown in the figures, the conventional wire grid polarizer 20 is an element for generating polarized light using a conductive wire grid, which has a structure formed with a wire grid pattern 22 where a nano size wire of a conductive material is arranged in parallel at regular intervals. Since such a wire grid polarizer 20 does not generate diffraction if the interval of the wire grid is smaller than the wavelength of incident light, wire grid polarizer 20 passes components having a vibration direction perpendicular to the conductive wire grid among the incident light, i.e., transverse magnetic (TM) polarized light, and reflects components having a vibration direction parallel to the wire grid, i.e., transverse electric (TE) light.

However, the conventional wire grid polarizer 20 described above is provided with a wire grid pattern of the same shape on all the area of the substrate 21 and has a structure where a single wire grid pattern of the same shape is uniformly applied to all wavelength bands of visible light, and thus it may obtain comparatively superior light efficiency from the light of a specific wavelength. However, light efficiency of the light of the other wavelengths is not favorable. That is, as shown in FIG. 4, in the case of light polarized through the wire grid polarizers 20a and 20b disposed under and on the liquid crystal layer 13 in the LCD device 10, only the light of a specific wavelength component (e.g., arrow G in the figure) has a high transmittance, and light of the other wavelength components (e.g., arrows R and B in the figure) does not have a good transmittance, and thus light efficiency thereof is lowered. As described, the conventional wire grid polarizer 20 is not optimally designed for respective colors of red, green and blue of the color filter substrate 12, and thus the light efficiency is favorable only in a specific wavelength band, and the overall light efficiency is lowered. Furthermore, since there is a technical limit in manufacturing a wide area nano-wire pattern, development of a reflective polarizer element of a new concept for improving light efficiency is desperately required.

SUMMARY OF THE INVENTION

Therefore, the present invention has been made in view of the above problems, and it is an object of the present invention to provide a wire grid polarizer capable of improving polarization performance, efficiency of reusing light and light efficiency by applying a nano-wire grid pattern optimized for each color of a color filter substrate to a liquid crystal display, a method of manufacturing thereof, and a liquid crystal display panel and a liquid crystal display device provided with the wire grid polarizer.

To accomplish the above object, according to one aspect of the present invention, there is provided a wire grid polarizer having a plurality of areas, and a shape of a wire grid pattern of an area among the plurality of areas is different from those of the other areas.

At this point, at least one of a period P, a height H, a width W and a duty cycle DC of an area among the plurality of areas may be different from those of the other areas.

In addition, the wire grid polarizer has a plurality of pixel areas, and each pixel area has a plurality of sub-pixel areas. A shape of a wire grid pattern of a sub-pixel area among the plurality of sub-pixel areas may be different from those of the other sub-pixel areas.

Then, the wire grid pattern may be formed to have an array structure parallel to a boundary surface partitioning the plurality of sub-pixel areas.

Or, the wire grid pattern may be formed to have an array structure perpendicular to a boundary surface partitioning the plurality of sub-pixel areas.

The wire grid pattern may be formed by patterning a conductive material in a wire grid shape on a glass substrate of a transparent material.

At this point, the wire grid pattern may be formed by repeatedly imprinting a stamp on imprinting resin using the stamp formed with the wire grid pattern of a different shape by a unit of a sub-pixel, a pixel or a pixel group, while the imprint resin containing a conductive material is formed on a substrate.

Or, the wire grid pattern may be formed through a lithography process of laser interference by sequentially applying a plurality of masks opened or closed for each sub-pixel area, while a photo-resist layer is formed on a substrate.

Or, the wire grid pattern may be formed by forming a wire grid pattern of a different shape for each sub-pixel area on a photo-resist layer using E-beams, forming the wire grid pattern by etching the conductive material using the photo-resist formed with the wire grid pattern as a mask, and removing remaining photo-resist, while a conductive material layer and the photo-resist layer are sequentially stacked on a substrate.

Meanwhile, according to another aspect of the present invention, there is provided a liquid crystal panel provided with a TFT substrate, a color filter substrate disposed to be opposite to the TFT substrate, and a liquid crystal layer interposed between the TFT substrate and the color filter substrate. The liquid crystal panel includes a wire grid polarizer having a plurality of areas corresponding to sub-pixels of the color filter substrate, and a shape of a wire grid pattern of an area among the plurality of areas is different from those of the other areas.

Here, the wire grid polarizer may be disposed under the liquid crystal layer.

At this point, a polarizing plate may be further provided between the liquid crystal layer and the wire grid polarizer.

Or, the wire grid polarizer may be disposed over the liquid crystal layer.

Meanwhile, a sub-pixel color of the color filter substrate may be configured with red R, green G and blue B.

Or, a sub-pixel color of the color filter substrate may be configured with red R and green G or blue B and green G.

At this point, the wire grid pattern may be formed to have an array structure parallel to a boundary surface partitioning sub-pixel areas.

Or, the wire grid pattern may be formed to have an array structure perpendicular to a boundary surface partitioning sub-pixel areas.

Then, a wire width of the wire grid pattern of each color of the sub-pixel may be formed to have a size of R>G>B.

In addition, a wire height of the wire grid pattern of each color of the sub-pixel may be formed to have a height of R>G>B.

Meanwhile, according to another aspect of the present, invention, there is provided a liquid crystal display device comprising: a display unit including a liquid crystal panel provided with a TFT substrate, a color filter substrate disposed to be opposite to the TFT substrate, and a liquid crystal layer interposed between the TFT substrate and the color filter substrate; and a backlight unit for generating light and providing the display unit with the light. The liquid crystal display device includes a wire grid polarizer having a plurality of areas corresponding to sub-pixels of the color filter substrate, and a shape of a wire grid pattern of an area among the plurality of areas is different from those of the other areas.

Here, the wire grid polarizer may be disposed under the liquid crystal layer.

At this point, a polarizing plate may be further provided between the liquid crystal layer and the wire grid polarizer.

Or, the wire grid polarizer may be disposed over the liquid crystal layer.

Meanwhile, a sub-pixel color of the color filter substrate may be configured with red R, green G and blue B.

Or, a sub-pixel color of the color filter substrate may be configured with red R and green G or blue B and green G.

At this point, the wire grid pattern may be formed to have an array structure parallel to a boundary surface partitioning sub-pixel areas.

Or, the wire grid pattern may be formed to have an array structure perpendicular to a boundary surface partitioning sub-pixel areas.

Then, a wire width of the wire grid pattern of each color of the sub-pixel may be formed to have a size of R>G>B.

In addition, a wire height of the wire grid pattern of each color of the sub-pixel may be formed to have a height of R>G>B.

Meanwhile, according to another aspect of the present invention, there is provided a method of manufacturing a wire grid polarizer, the method repeatedly performing, a plurality of times, a unit process of forming a wire grid pattern by a unit of at least one pixel area.

At this point, the wire grid pattern may be manufactured using a stamp having a pattern corresponding to a wire grid pattern of the at least one pixel area.

In addition, the wire grid pattern may be manufactured through a lithography process of laser interference using a mask having a pattern corresponding to a wire grid pattern of the at least one pixel area.

DETAILED DESCRIPTION OF THE PREFERRED EMBODIMENT

The preferred embodiments of the invention will be hereafter described in detail, with reference to the accompanying drawings.

Figure 1:
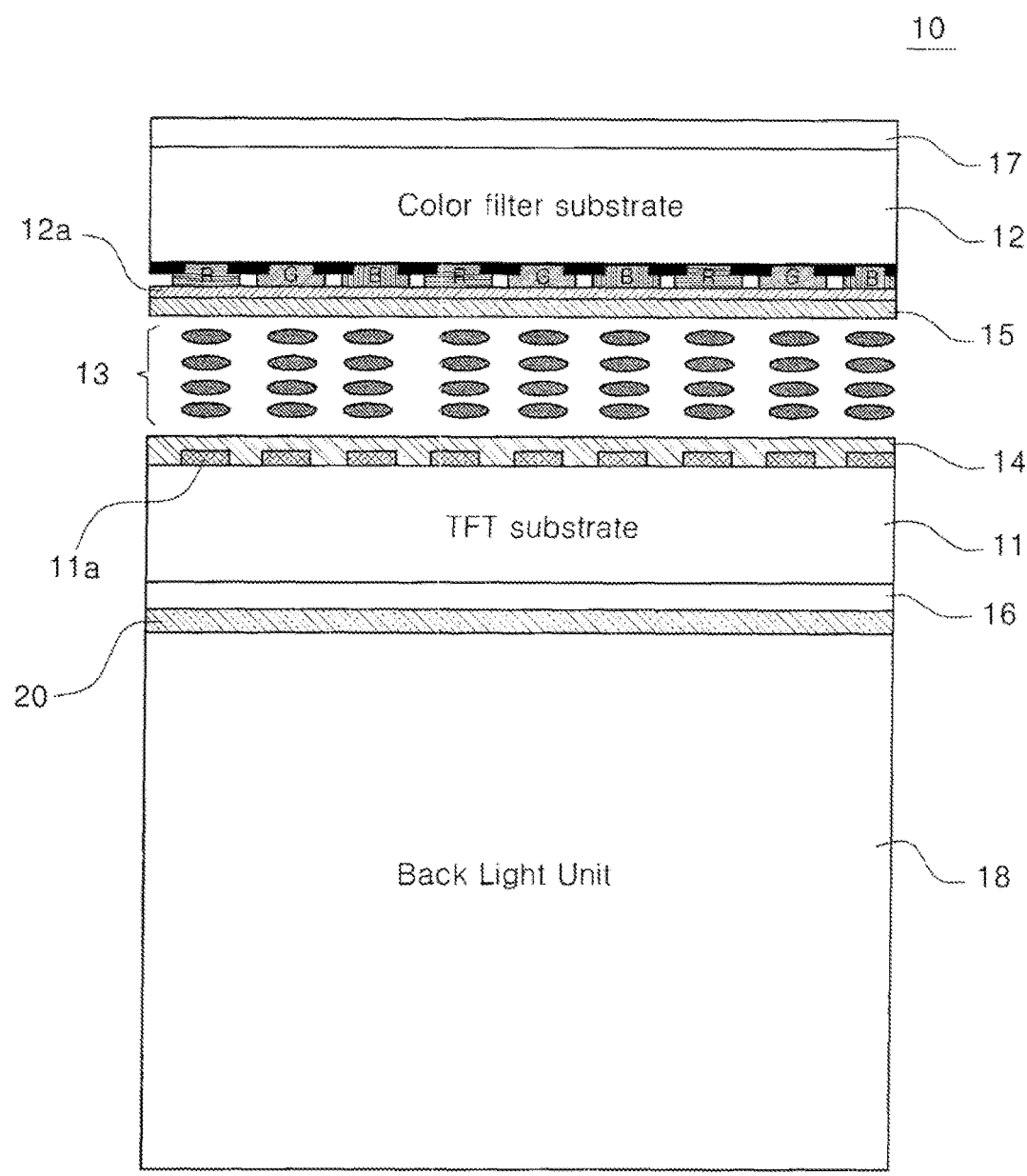
FIG. 1 is a cross sectional view showing the structure of a conventional LCD device.
Figure 2:
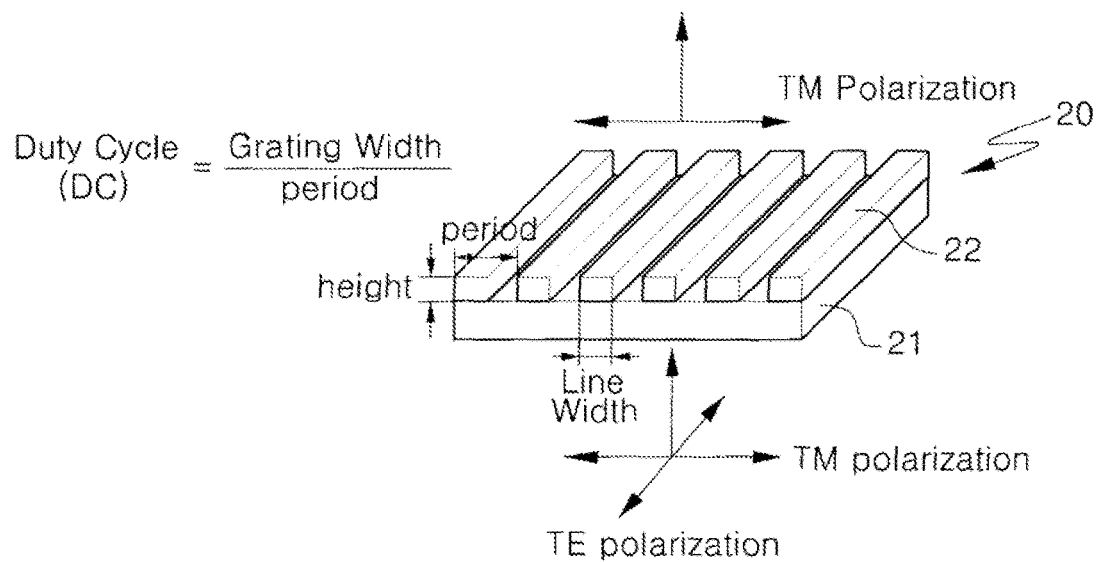
FIG. 2 is a perspective view showing the structure of a wire grid polarizer provided in the conventional LCD device.
Figure 3:
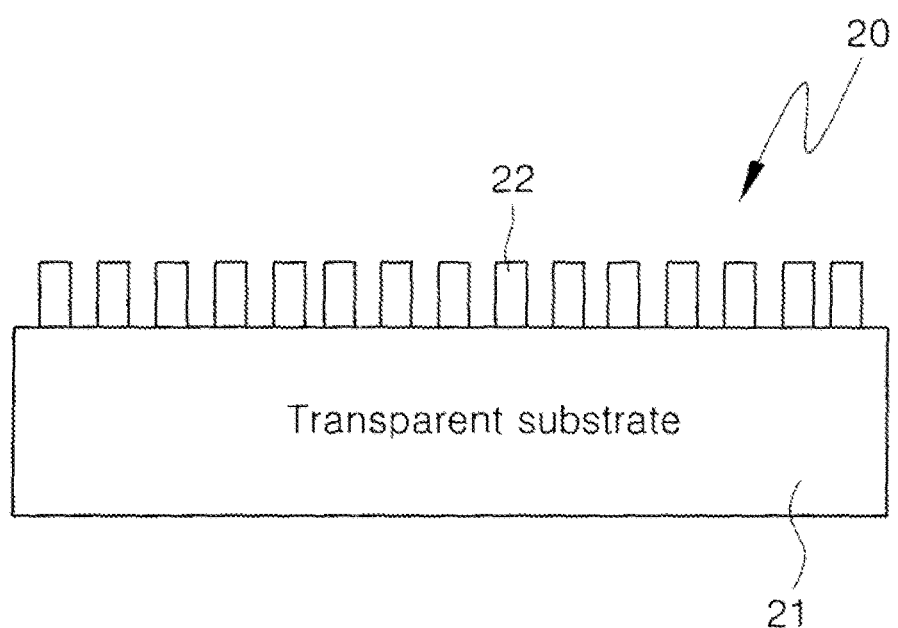
FIG. 3 is a cross sectional view showing the wire grid polarizer of FIG. 2.
Figure 4:
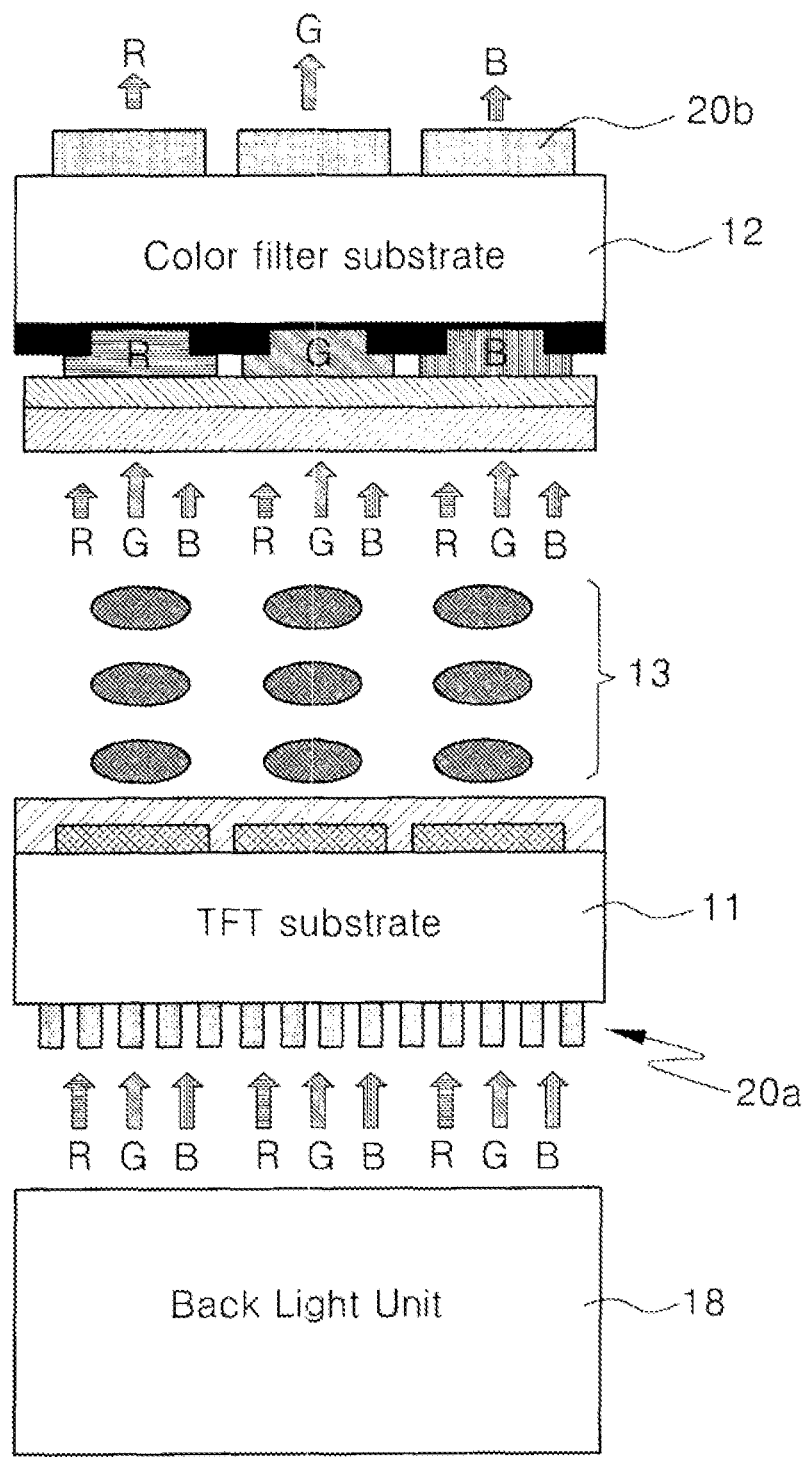
FIG. 4 is a view showing an example of a LCD device applied with a conventional wire grid polarizer in which optical transmittance is concentrated on a specific wavelength band.
Figure 5:
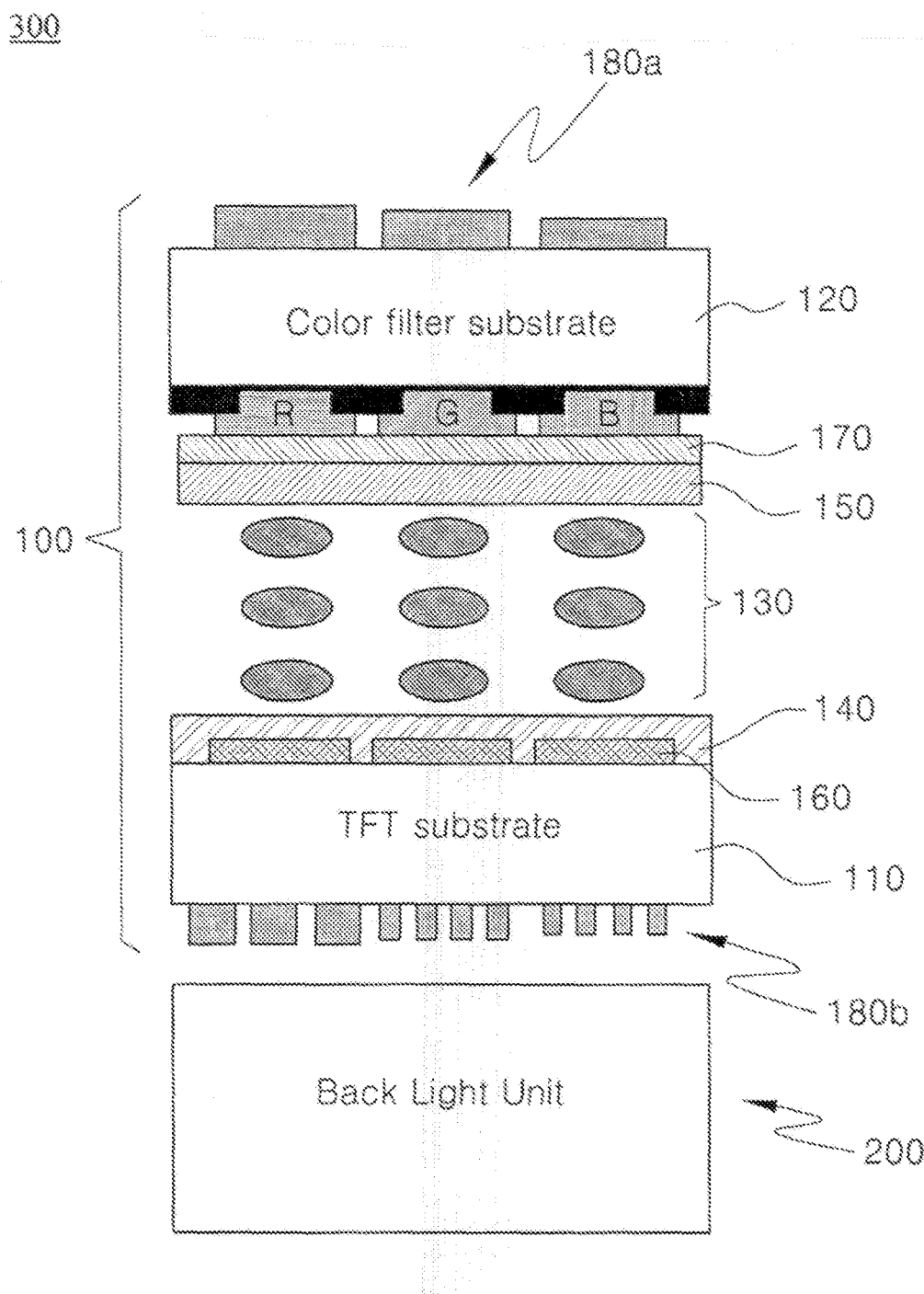
FIG. 5 is a cross sectional view showing a LCD device according to an embodiment of the present invention.

FIG. 5 is a cross sectional view showing a LCD device according to an embodiment of the present invention (FIG. 5 shows only one pixel unit for convenience).

As shown in FIG. 5, the LCD device 300 according to an embodiment of the present invention is configured with a display unit 100 for displaying an image by adjusting optical transmittance of liquid crystal according to inputted image data, and a backlight unit 200 for generating light and providing the display unit 100 with the light.

The display unit 100 includes a liquid crystal display panel configured with a TFT substrate 110 formed with a gate line, a data line, thin film transistors (TFT) and pixel electrodes, a color filter substrate 120 disposed over the TFT substrate 110 to be opposite to the TFT substrate 110 and formed with a color filter and a common electrode, and a liquid crystal layer 130 interposed between the TFT substrate 110 and the color filter substrate 120.

The TFT substrate 110 is a transparent glass substrate formed with thin film transistors on a matrix, in which the data line is connected to the source terminal, and the gate line is connected to the gate terminal. In addition, the pixel electrodes 160 made of transparent indium tin oxide (ITO), which is a conductive material, are formed at the drain terminal.

The color filter substrate 120 is a substrate on which R (red), G (green), and B (blue) pixels, which are color pixels emitting a certain color when light passes through, are formed through a thin film process, and the common electrode 170 made of ITO is spread on the front side thereof. At this point, alignment films 140 and 150 for aligning liquid crystal provided in the liquid crystal layer 130 are provided under the color filter substrate 110 and on the TFT substrate 110.

Meanwhile, wire grid polarizers 180a and 180b, which are reflective polarizer elements for passing a specific polarizing component among incident light and reflecting the other polarizing components, are provided in the directions of top and bottom from the liquid crystal layer 130. (Hereinafter, it will be described by assigning reference symbol 180 to the wire grid polarizer 180b positioned under the liquid crystal layer 130 for the convenience of explanation.)

Figure 6:
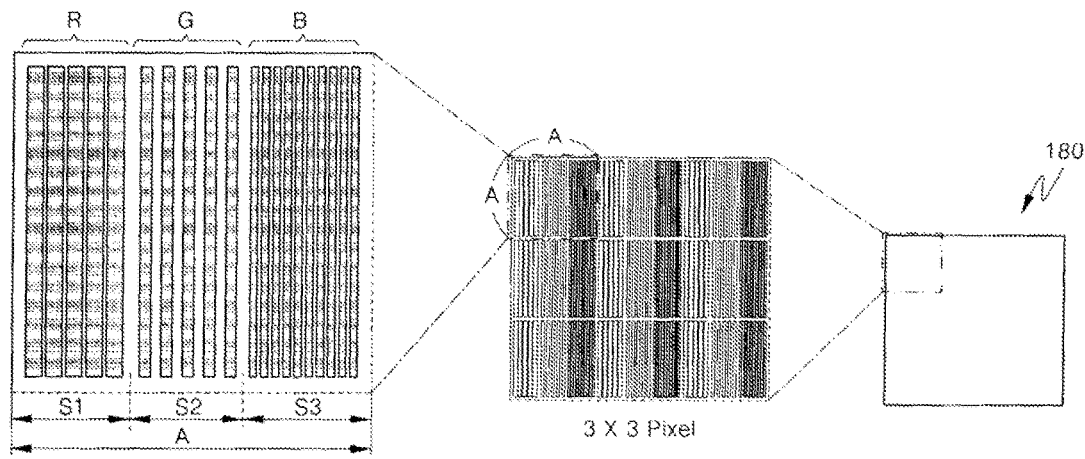
FIG. 6 is a plan view showing the pattern structure of a wire grid polarizer provided in a LCD device of the present invention.
Figure 7:
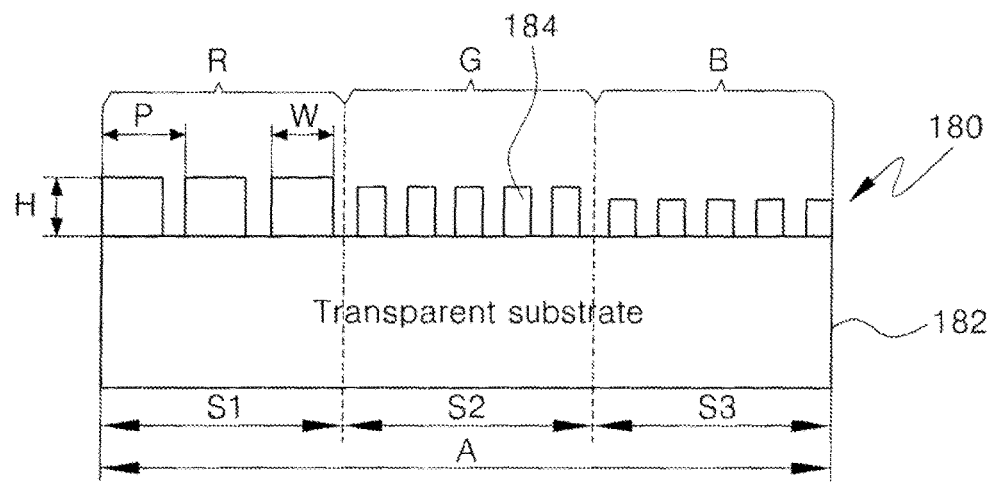
FIG. 7 is a cross sectional view showing a wire grid polarizer according to the present invention (showing only one pixel).
Figure 8:
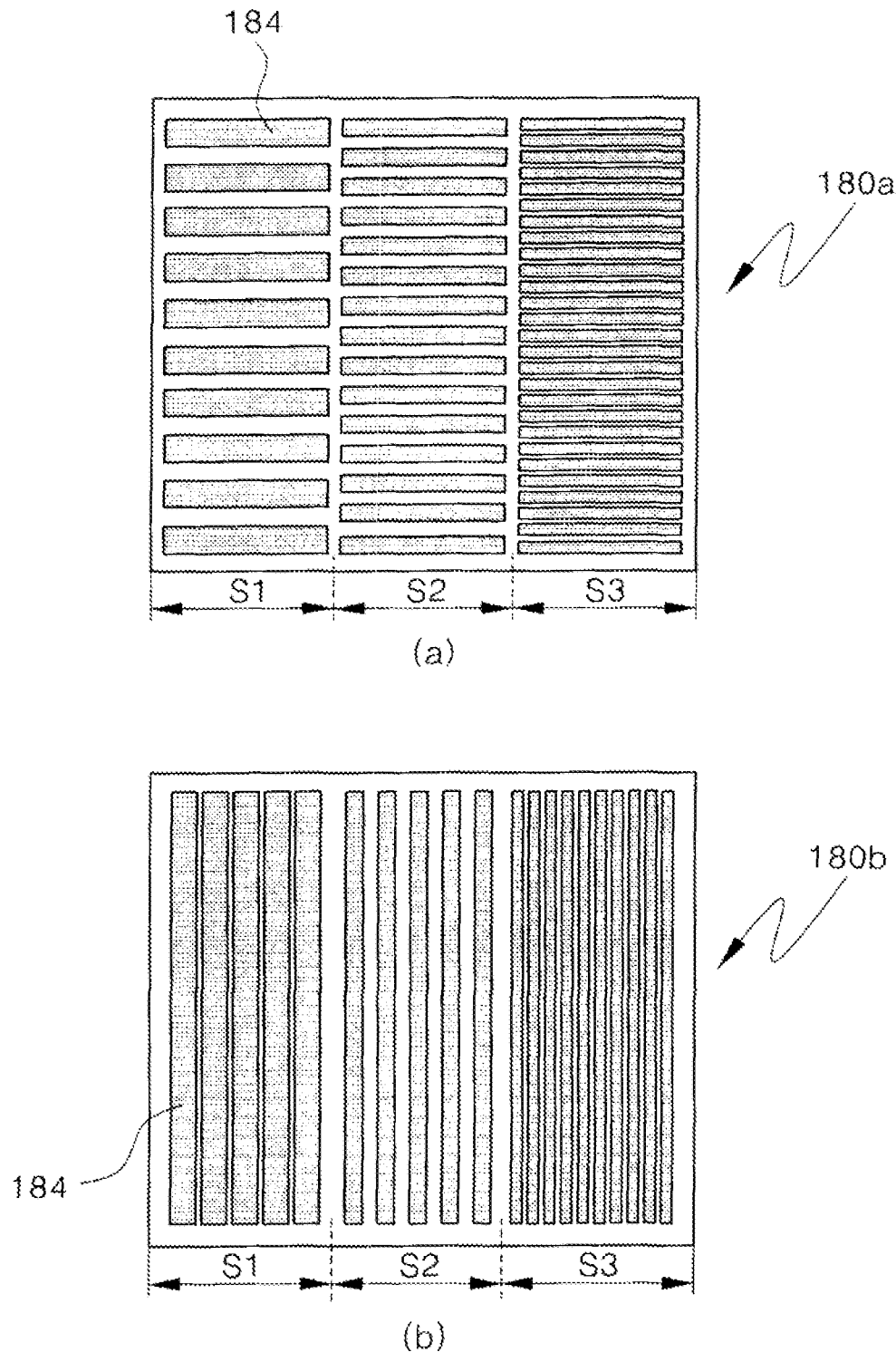
FIG. 8 is a plan view showing the pattern structure of wire grid polarizers disposed over and under the liquid crystal layer of a LCD device according to the present invention.
Figure 9:
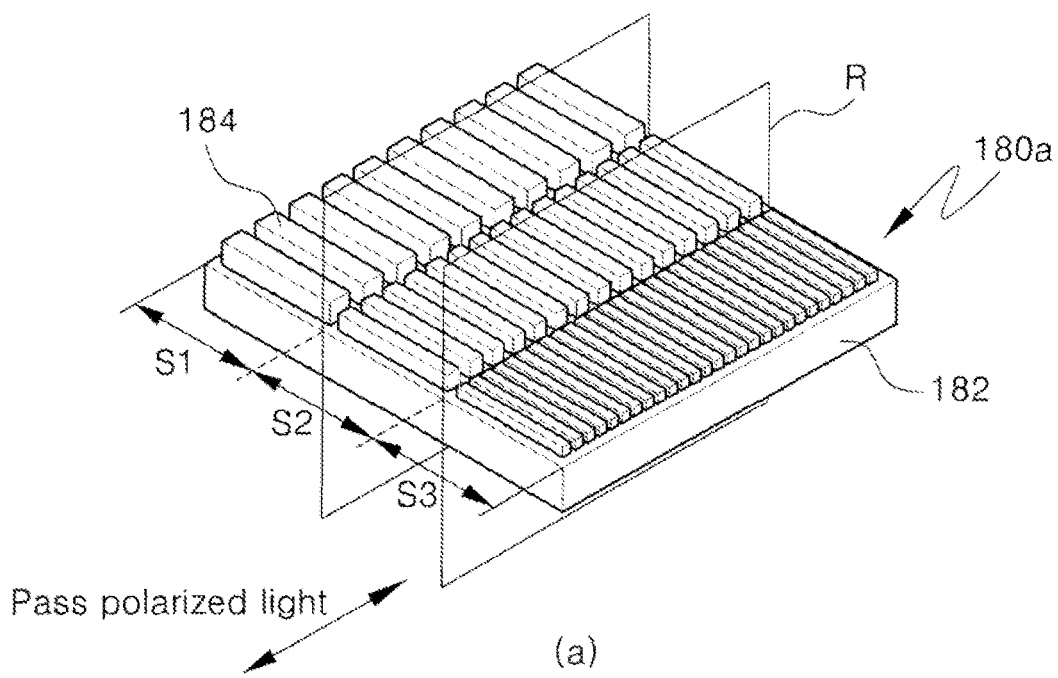
FIG. 9 is a perspective view showing three-dimensional structures of the wire grid polarizers shown in FIG. 8.
Figure 9:
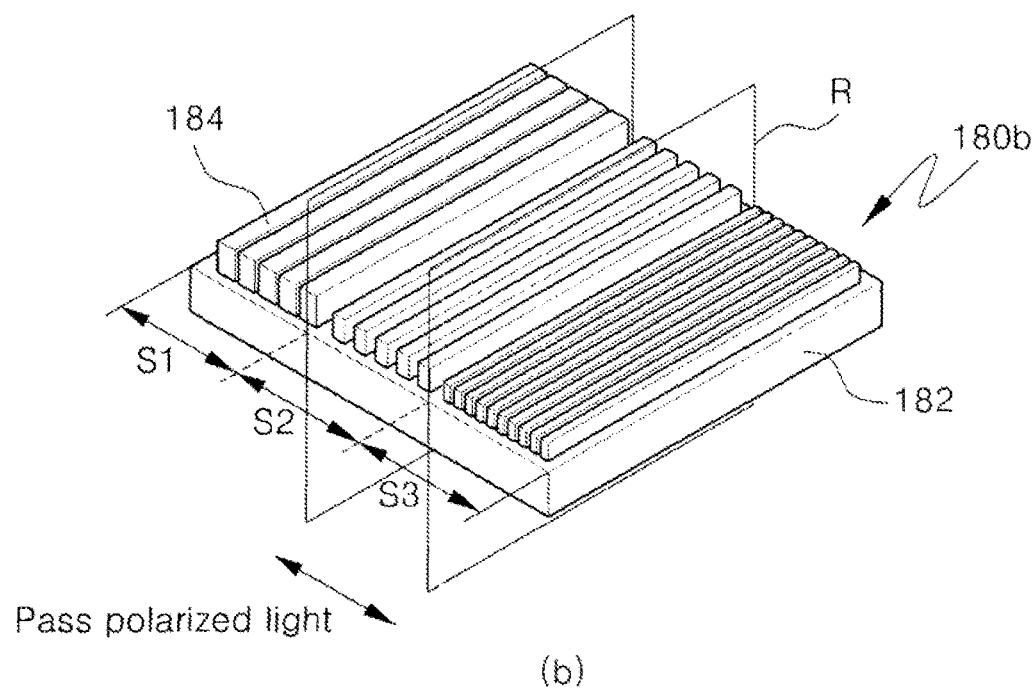

FIG. 6 is a plan view showing the pattern structure of a wire grid polarizer 180 provided in a LCD device 300 of the present invention, and FIG. 7 shows a cross sectional structure of a wire grid polarizer 180 according to the present invention, which is a cross sectional view showing a wire grid pattern structure formed on a unit pixel. FIG. 8 is a plan view showing the pattern structure of wire grid polarizers 180a and 180b disposed over and under the liquid crystal layer 130 of a LCD device 300 according to the present invention, and FIG. 9 is a perspective view showing three-dimensional structures of the wire grid polarizers shown in FIG. 8.

Referring to FIGS. 6 to 9, the wire grid polarizer 180 according to the present invention is a polarizer element in which a conductive material (e.g., a metal) is disposed on a transparent substrate 182 to form a pattern of a wire grid of a nano size. The wire grid polarizer 180 has a plurality of areas (three areas in the figure) S1, S2 and S3 corresponding to three sub-pixel areas (R, G and B areas) configuring a unit pixel of the color filter substrate 120, and the shapes of the wire grid patterns 184 formed in the plurality of areas S1, S2 and S3 are different from one another.

Specifically, as shown in FIG. 6, the wire grid polarizer 180 has a plurality of pixel areas arranged in a matrix form, and each pixel area has a plurality of sub-pixel areas S1, S2 and S3. Here, the plurality of pixel areas corresponds to pixels of the color filter substrate 120, and the plurality of sub-pixel areas S1, S2 and S3 corresponds to sub-pixels of the color filter substrate 120.

Here, the color filter substrate 120 has a structure in which three color pixels, i.e., three sub-pixels corresponding to R, G and B, configure a unit pixel, and a black matrix is formed between the R, G and B sub-pixel areas. Accordingly, the plurality of pixel areas formed in the wire grid polarizer 180 has an R sub-pixel area S1, a G sub-pixel area S2, and a B sub-pixel area S3. At this point, the wire grid pattern 184 formed in each of the R, G and B sub-pixel areas S1, S2 and S3 has a shape different from those of the other sub-pixel areas.

FIG. 7 shows wire grid pixel patterns 184 formed in the R, G and B sub-pixel areas S1, S2 and S3 with different width W, height H and period P in a unit pixel A.

Here, the width W of the wire grid pattern 184 formed for each color of a sub-pixel is formed to have a size of R>G>B, and in addition, the height H of the wire grid pattern 184 can be formed to have a height of R>G>B.

At this point, if the period of forming the wire grid pattern 184 is P and the width of the wire grid pattern 184 is W in the wire grid pattern 184 formed in each sub-pixel area S1, S2 or S3 of each of R, G and B colors, a duty cycle (DC) for forming the wire grid pattern 184 is expressed as $$DC = \frac{W}{P}.$$

Here, the shape of the wire grid pattern 184 is changed depending on the period P, width W, height H and duty cycle DC of the wire grid pattern 184, and thus at least one of the period P, width W, height H and duty cycle of the wire grid pattern 184 is different from those of the other wire grid patterns 184 in each area. The wire grid pattern 184 can be formed in the most preferable pattern shape by appropriately designing values of the period P, width W, height H and DC for the wavelength band of each color depending on the color R, G or B of a sub-pixel.

Meanwhile, in the LCD device 300, the wire grid polarizers 180a and 180b can be provided in the directions of top and bottom from the liquid crystal layer 130.

At this point, as is shown in the shapes of the wire grid patterns shown in FIGS. 8 and 9, the wire grid pattern 184 formed on the substrate 182 may be formed to have an array structure perpendicular to the boundary surface R of the sub-pixels S1, S2 and S3 (FIG. 9(a)) or may be formed to have an array structure parallel to the boundary surface R of the sub-pixels S1, S2 and S3 (FIG. 9(b)).

That is, the polarization axis of the wire grid pattern 184 of the wire grid polarizer 180a provided over the liquid crystal layer 130 is preferably perpendicular to the polarization axis of the wire grid pattern 184 of the wire grid polarizer 180b provided under the liquid crystal layer 130. This is the same as the reason that polarization axes of general polarizing plates employed over and under the liquid crystal layer 130 are perpendicular to each other.

In addition, the wire grid polarizer 180 can be used at least over or under the liquid crystal layer 130 in the LCD device 300. For example, the wire grid polarizer 180 can be provided only under the liquid crystal layer 130, or only over the liquid crystal layer 130, or both over or under the liquid crystal layer 130 as shown in FIG. 5.

In addition, the wire grid polarizer 180 may substitute for a general polarizing plate or can be used together with the polarizing plate. For example, the general polarizing plate can be attached to the bottom surface of the liquid crystal panel, and the wire grid polarizer 180 of the present invention can be provided under the polarizing plate. FIG. 5 described above shows an example of the wire grid polarizer 180 used in substitution for a general polarizing plate.

Figure 10:
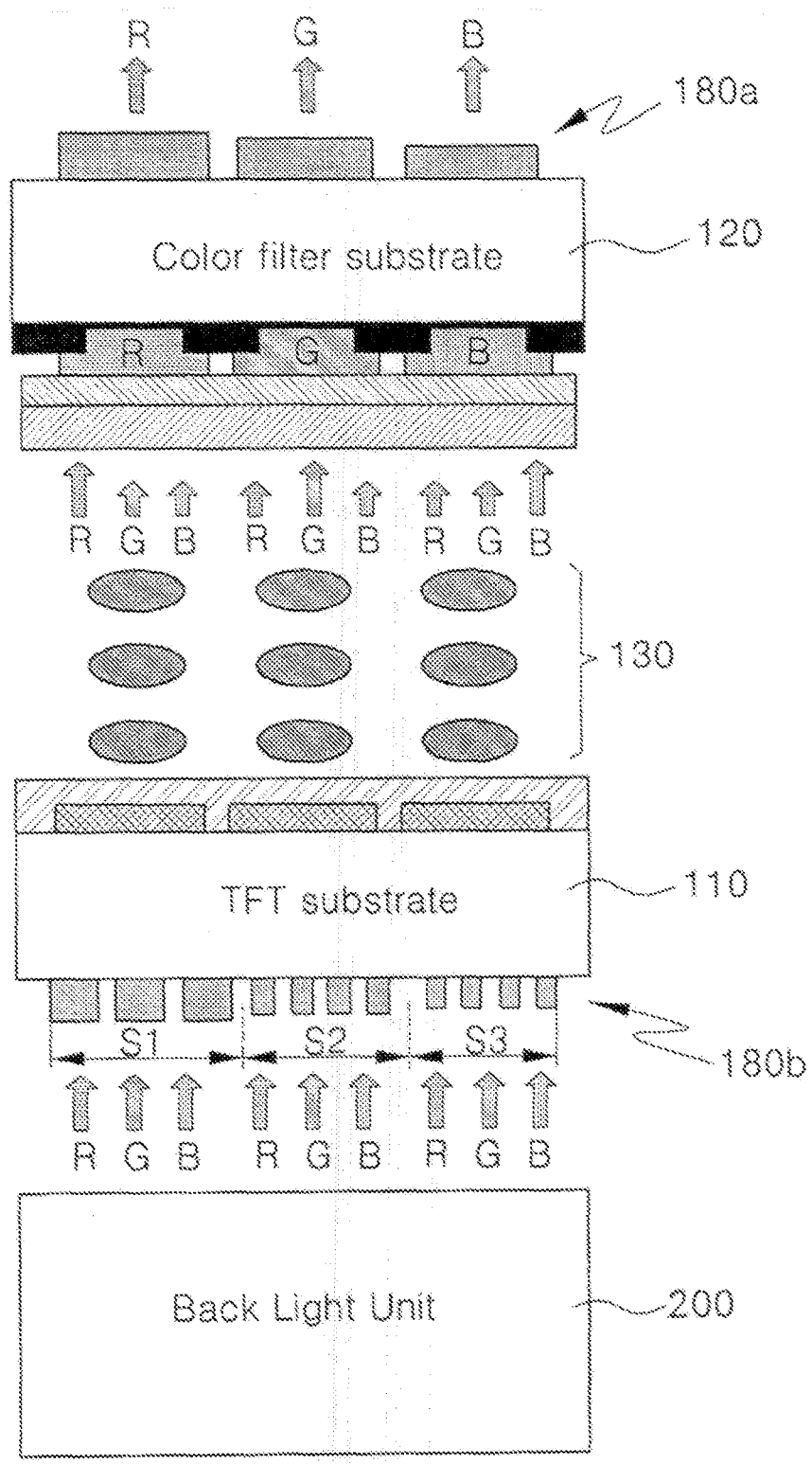
FIG. 10 is a view illustrating the principle of improving light efficiency in a LCD device applied with a wire grid polarizer of the present invention.

In the wire grid polarizer of the present invention configured as described above, as shown in FIG. 10, the R sub-pixel area S1 of the wire grid polarizer 180b positioned under the liquid crystal layer 130 passes polarized light of the R wavelength band to the maximum, and the passed light passes through the liquid crystal layer 130 and arrives at the color filter of the R sub-pixel. The color filter of the R sub-pixel passes light of the R wavelength band and absorbs light of the other wavelength bands.

In the same manner, the G sub-pixel area S2 of the wire grid polarizer 180b positioned under the liquid crystal layer 130 passes polarized light of the G wavelength band to the maximum, and the passed light passes through the liquid crystal layer 130 and arrive at the color filter of the G sub-pixel. The color filter of the G sub-pixel passes light of the G wavelength band and absorbs light of the other wavelength bands. It is the same as described above for the B wavelength band.

As described above, when the wire grid pattern 184 is formed on the wire grid polarizer 180, the wire grid pattern 184 is formed in a different optimized pattern shape for each color R, G or B of a sub-pixel of the color filter substrate 120, and a superior transmittance can be obtained for each of R, G and B wavelength bands, and thus the present invention may improve characteristics of light efficiency of the LCD device 300.

Figure 11:
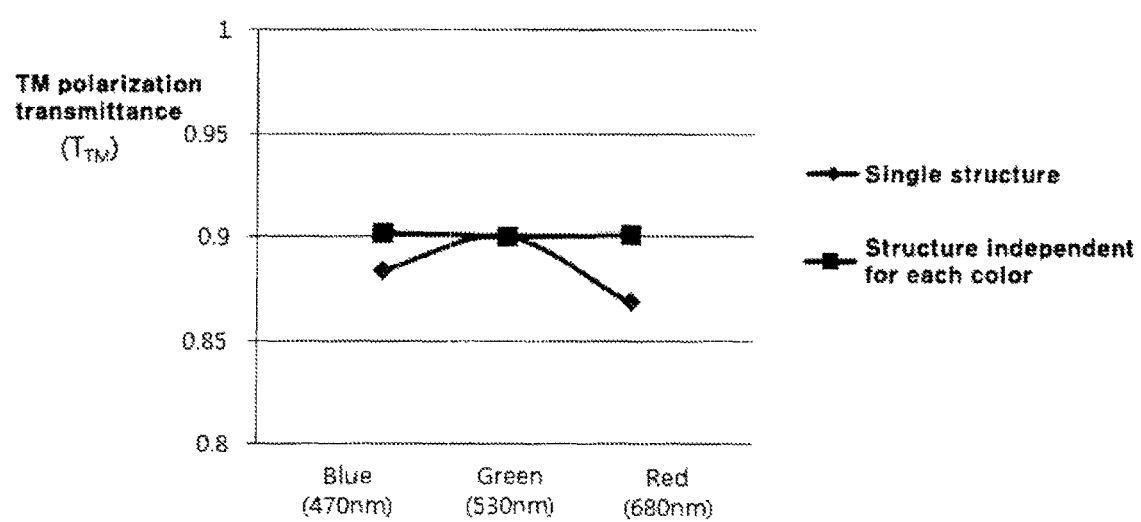
FIG. 11 is a graph comparing performance of TM polarization transmittance of each color obtained by a wire grid polarizer of the present invention with that of a conventional wire grid polarizer.

FIG. 11 is a graph comparing performance of TM polarization transmittance of each color obtained by a wire grid polarizer 180 of the present invention with that of a conventional wire grid polarizer.

As shown in FIG. 11, a result of TM polarization transmittance of the conventional wire grid polarizer of a single shape and a result of TM polarization transmittance of the wire grid polarizer 180 according to the present invention are obtained through a simulation. As a result, it is understood that the wire grid polarizer 180 according to the present invention having an independent pattern for each of the colors R, G and B of the sub-pixels has obtained superior transmittance for each of the wavelength bands R, G and B compared with the existing wire grid polarizer of a single shape.

Here, the conventional wire grid polarizer has a single shape of a period of 200 nm, a height of 165 nm and a duty cycle of 0.4. In addition, in the wire grid polarizer 180 according to the present invention, the red (R) has a period of 270 nm, a height of 220 nm and a duty cycle of 0.3, the green (G) has a period of 200 nm, a height of 165 nm and a duty cycle of 0.4, and the blue (B) has a period of 140 nm, a height of 150 nm and a duty cycle of 0.4.

Figure 12:
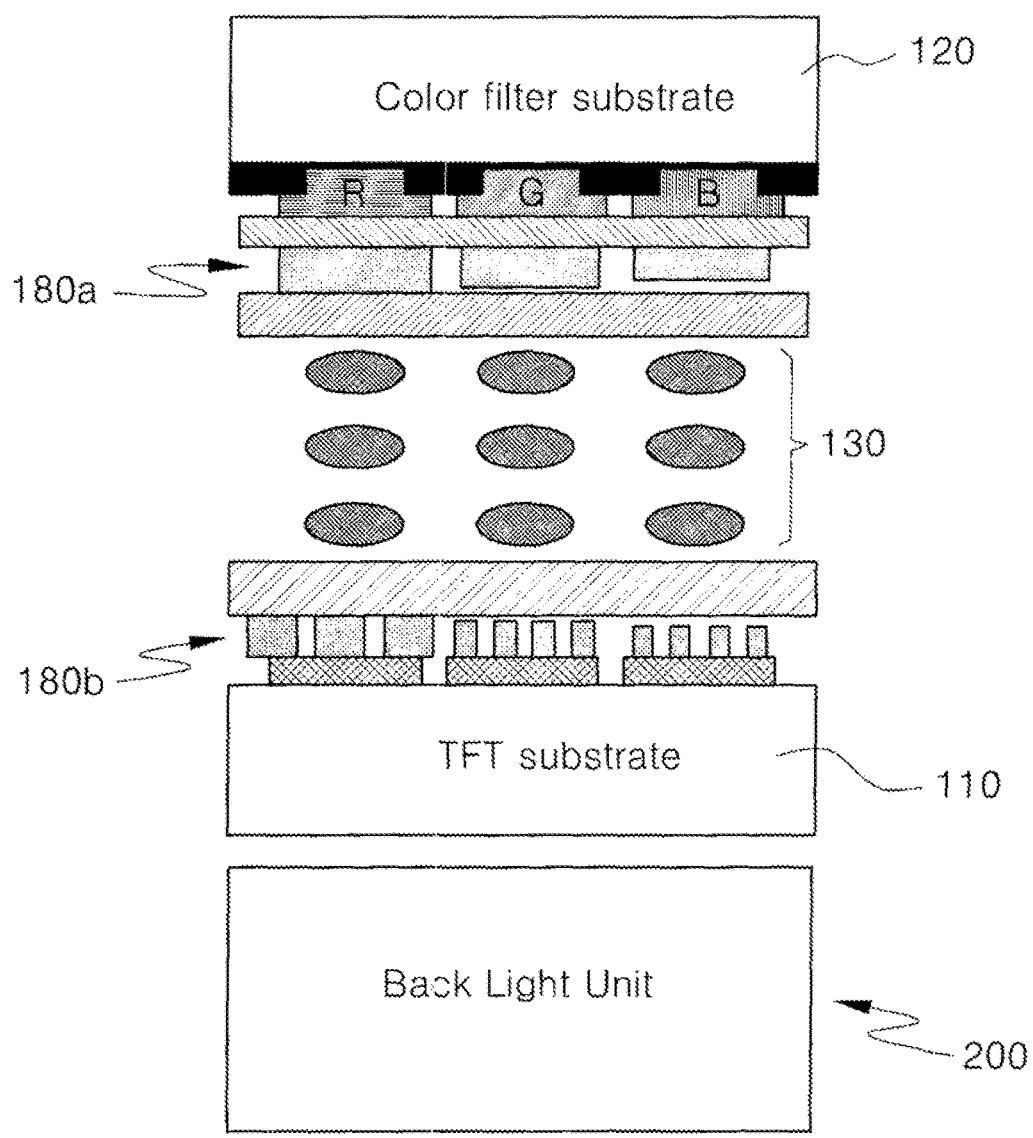
FIG. 12 is a view showing an example of wire grid polarizers of the present invention disposed on the TFT substrate and under the color filter substrate.

Meanwhile, FIG. 12 is a view showing an example of wire grid polarizers 180a and 180b of the present invention applied to different positions in the LCD device 300. The wire grid polarizers 180a and 180b of the present invention can be applied on the top of the color filter substrate 120 and on the bottom of the TFT substrate 110 as shown in the embodiment of FIG. 5 described above, or the wire grid polarizers 180a and 180b can be disposed on the bottom of the color filter substrate 120 and on the top of the TFT substrate 110 as shown in FIG. 12.

In addition, although a structure in which the wire grid pattern 184 is directly formed on the TFT substrate 110 or the color filter substrate 120 and the glass substrate 182 is described above as an example, the LCD device can be configured by forming, on a structure of a separate film (or sheet), wire grid patterns respectively having an independent structure different from each other in the shapes described above and disposing the film (or sheet) at an appropriate position above or under the liquid crystal layer 130.

In addition, although the LCD device 300 in which a sub-pixel color of the color filter substrate 120 is configured with three colors of red (R), green (G) and blue (B) is described as an example in the embodiment of the present invention described above, the present invention can be applied to a LCD device of a pentile method, in which the sub-pixel color of the color filter substrate 120 is configured with red (R) and green (G) or blue (B) and green (G) so that two colors of RG and BG configure one pixel, and pixels configured with RG and BG are alternately disposed.

Meanwhile, FIGS. 13 to 16 show a method of manufacturing a wire grid polarizer 180 according to a first embodiment of the present invention, which shows a method of manufacturing the wire grid polarizer 180 in an imprinting method.

Figure 13:
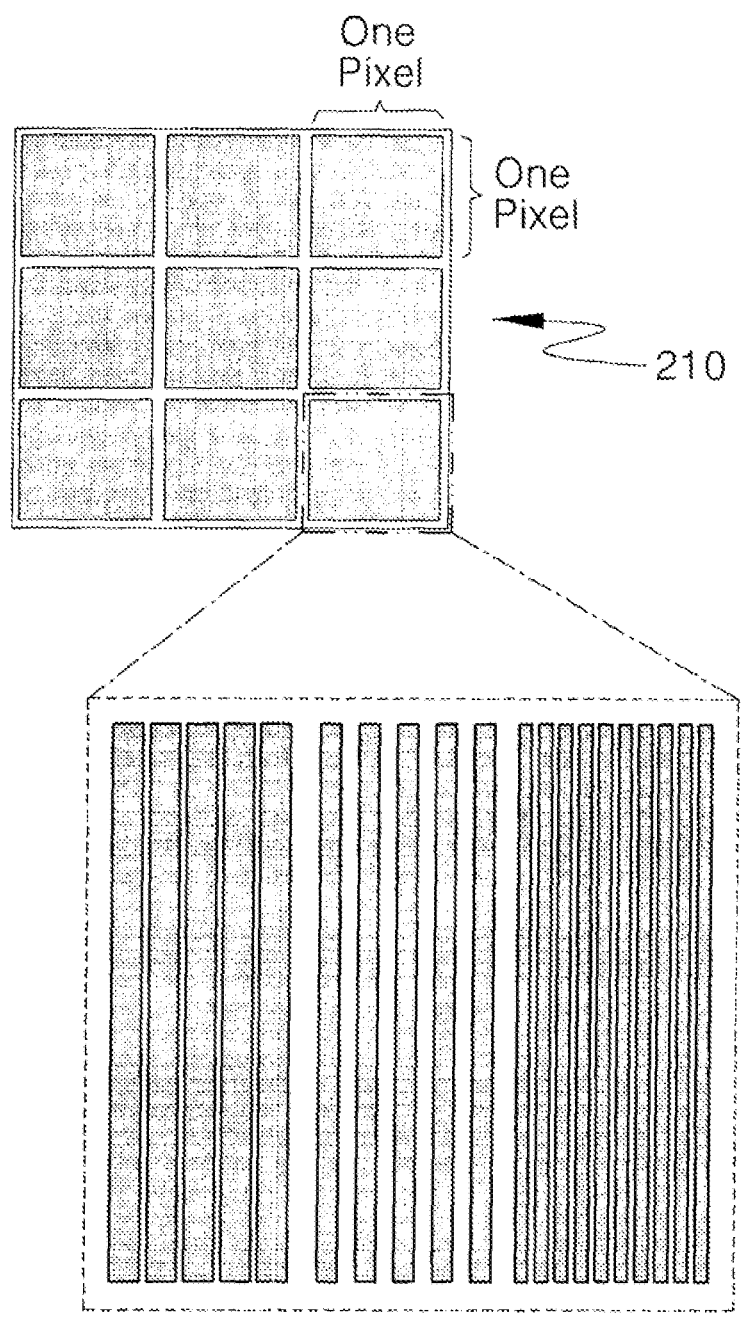
FIG. 13 is a plan view showing the structure of a stamp used for manufacturing a wire grid polarizer of the present invention.
Figure 14:
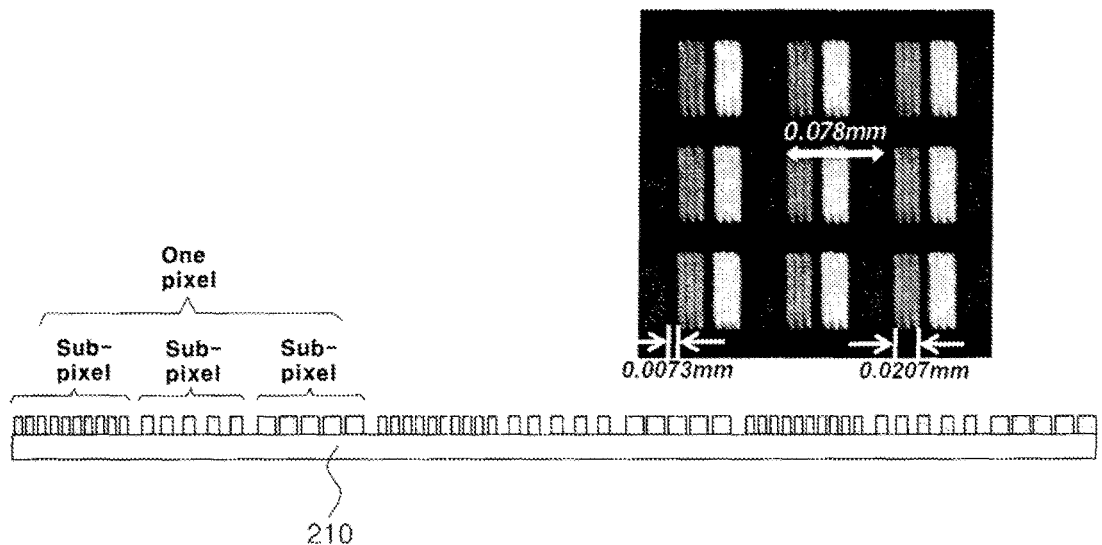
FIG. 14 is a cross sectional view showing the cross sectional structure of the stamp shown in FIG. 13.

Here, FIG. 13 is a plan view showing a stamp used for manufacturing the wire grid polarizer 180, and FIG. 14 is a cross sectional view showing the cross sectional structure of the stamp shown in FIG. 13.

First, the stamp 210 shown in FIGS. 13 and 14 is a stamp 210 that may form a wire grid pattern 184 of a 3×3 pixel area, and wire grid patterns of different shapes are formed in the three sub-pixel areas configuring one pixel. At this point, the gap between the sub-pixels is an area where a black matrix is positioned in a LCD device, which is an area through which light does not pass.

Figure 15:
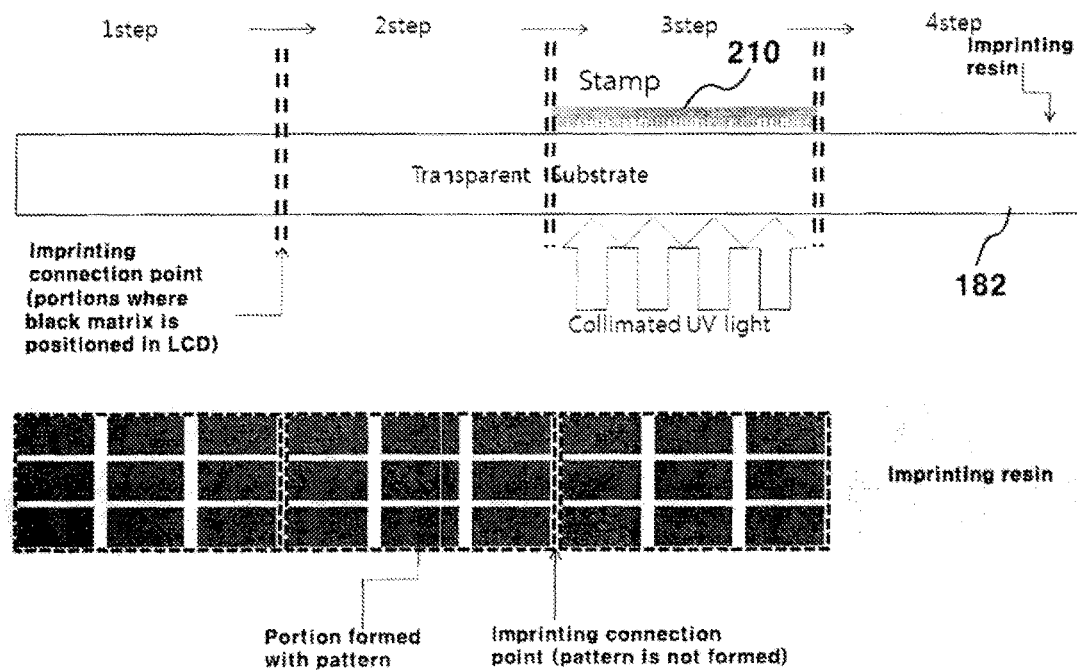
FIG. 15 is a view showing a process of manufacturing a wire grid polarizer through an imprinting process.

FIG. 15 is a view sequentially showing a process of manufacturing a wire grid polarizer 180 through an imprinting process using a stamp 210 formed with the wire grid pattern 184 described above.

As shown in FIG. 15, the wire grid patterns 184 may be formed on the substrate 182 through the sequential imprinting process shown in FIG. 15, using the stamp 210 formed with a wire grid pattern of a different shape for each sub-pixel area. That is, after applying imprinting resin containing a conductive material on the substrate 182 in order to form a wire grid, the stamp 210 having the wire grid patterns 184 shown in FIGS. 13 and 14 is placed on the substrate 182 where the imprinting resin is applied, and then the wire grid patterns are formed on the imprinting resin by applying pressure on the stamp 210 using a press. At this point, the wire grid patterns 184 are sequentially formed on the imprinting resin while moving the stamp 210 in the sequence of 1 step→2 step→3 step→4 step, and the wire grid polarizer is manufactured by repeatedly performing the imprinting unit process a plurality of times.

Figure 16:
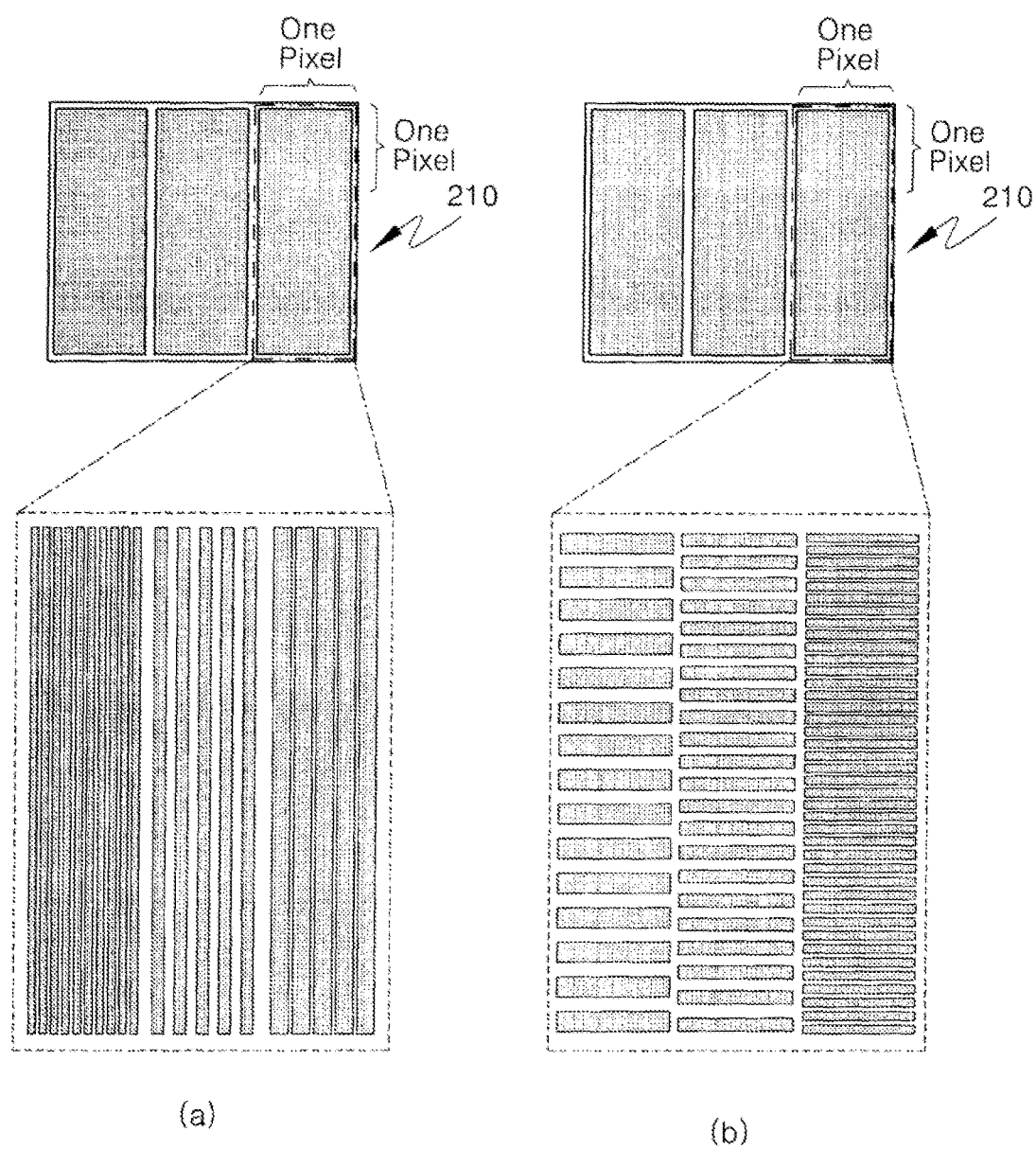
FIG. 16 is a view showing an example in which a wire grid pattern can be applied by one patterning without being separated by the pixel unit, when a wire grid polarizer is manufactured through an imprinting process.

FIG. 16 is a view showing another form of the wire grid patterns applied to the stamp 210 that is used in an imprinting process. As shown in FIG. 16, if pixels in a row are not separated by the pixel unit and a wire grid pattern is formed in a connected structure when a wire grid pattern is formed on the printing surface of the stamp 210, only one patterning needs be applied to the row of the entire pixels. In this case, the stamp can be easily manufactured since precision for forming the wire grid pattern on the stamp 210 can be lowered.

Figure 17:
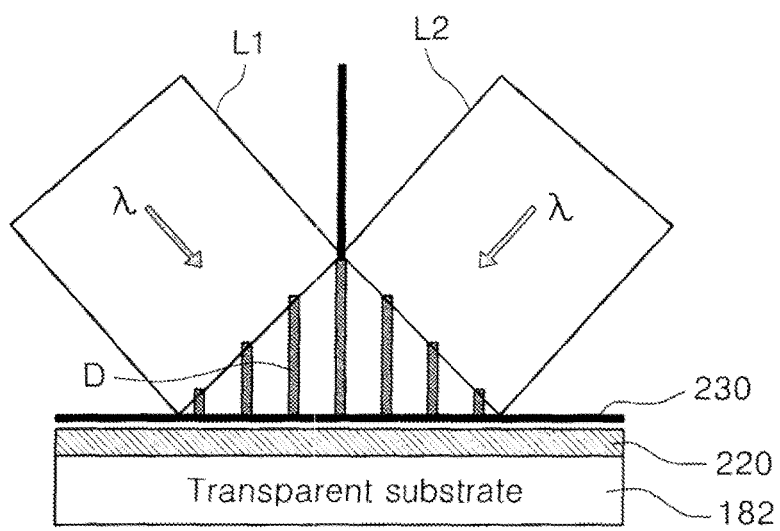
FIG. 17 is a cross sectional view showing a method of manufacturing a wire grid polarizer using a lithography process based on laser interference.
Figure 18:
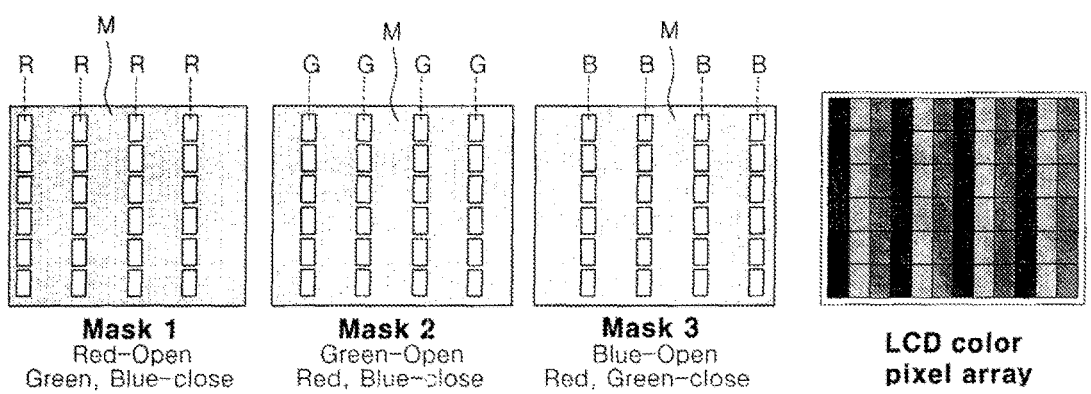
FIG. 18 is a plan view showing the structure of a mask used for a lithography process based on laser interference.

FIGS. 17 and 18 are views showing a method of manufacturing a wire grid polarizer 180 according to a second embodiment of the present invention, which show a method of manufacturing the wire grid polarizer 180 through a lithography process based on laser interference.

As shown in FIG. 17, first, a metal layer (not shown), which is a conductive material, is formed on the transparent substrate 182 to form wire grid patterns, and a photo-resist layer 220 is formed on the metal layer. A plurality of (three) masks M1, M2 and M3 opened and closed for each color R, G or B of a sub-pixel is sequentially applied as shown in FIG. 18, and wire grid patterns of different shapes are formed by radiating diffraction and interference fringes D, which are formed by the interference of laser beams L1 and L2 radiated from two light sources, on the opened sub-pixel areas of the mask. Next, the metal layer is etched using the photo-resist formed with the wire grid patterns as a mask, and manufacturing the wire grid polarizer 180 is completed by removing the photo-resist remaining on the metal layer.

Here, in a method similar to the process of FIG. 15 described above, the wire grid polarizer can be manufactured by dividing the entire area of the wire grid polarizer and repeating, a plurality of times, the laser interference lithography unit process which forms wire grid patterns by the unit of at least one pixel area. At this point, in the unit process, the patterning is accomplished using three times of laser interference, once for each mask M1, M2 and M3. If the lithography of the laser interference is used as described, the wire grid patterns 184 can be efficiently and easily formed on the substrate 182 of a large area.

Figure 19:
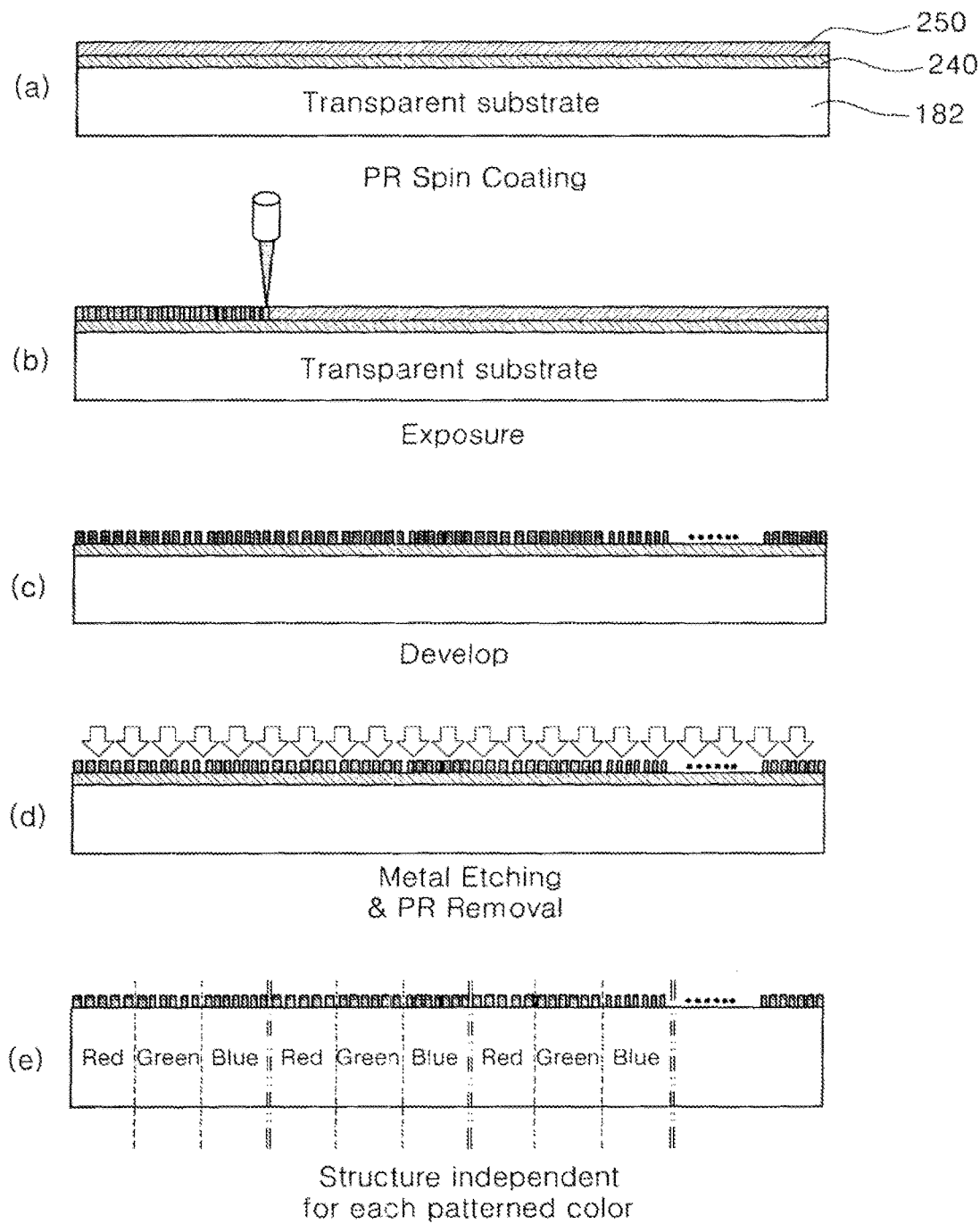
FIG. 19 is a view sequentially showing a process of manufacturing a wire grid polarizer through a lithography process using electronic beams.

Meanwhile, FIG. 19 is a view showing a method of manufacturing a wire grid polarizer 180 according to a third embodiment of the present invention, which shows a method of manufacturing the wire grid polarizer 180 through a lithography process using electronic beams (E-beams).

In the method of manufacturing a wire grid polarizer 180 using an electronic beam lithography process according to a third embodiment of the present invention, as shown in FIG. 19, first, a metal layer 240 made of a conductive material and a photo-resist layer 250 are formed on the transparent substrate 182 in order to form a nano wire grid pattern, and then wire grid patterns respectively having a different pattern shape for each color area R, G or B of a sub-pixel are formed by radiating E-beams on the photo-resist layer 250. Then, the metal layer 240 is etched in a dry or wet etching process using the photo-resist layer 250 formed with the wire grid patterns as a mask, and the wire grid polarizer 180 is completed by removing the photo-resist layer 250 remaining on the metal layer 240 formed with the wire grid patterns.

As described above, a wire grid pattern across the entire area of a wire grid polarizer can be formed in one process when the wire grid polarizer of the present invention is manufactured. In addition, if a large area wire grid polarizer is required in accordance with the tendency of large area display devices, the wire grid polarizer can be efficiently manufactured by dividing the entire area of the wire grid polarizer and repeatedly performing, a plurality of times, a unit process of forming a wire grid pattern by the unit of at least one pixel area. In this case, since the unit process can be performed using the space between pixel areas of the wire grid polarizer corresponding to the black matrix of the liquid display panel as a boundary, precision of arranging the wire grid patterns is superior.

Although an example of using the wire grid polarizer 180 in the LCD device 300 is described in the embodiment of the present invention described above, the present invention is not limited thereto, but the wire grid polarizer 180 of the present invention can be employed and used in a variety of devices. In addition, the method of manufacturing a wire grid polarizer of the present invention is not limited to the manufacturing methods described above, such as imprinting, laser interference lithography, E-beam lithography and the like, but the wire grid polarizer can be manufactured in a variety of methods.

In the wire grid polarizer provided in the LCD device according to the present invention configured as described above, since wire grid patterns of different shapes are formed depending on the color of each sub-pixel area of the color filter substrate, a grating pattern optimized for the color of each sub-pixel can be applied, and thus light efficiency of the LCD device can be improved.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A wire grid polarizer comprising:
   a plurality of pixel areas each having red (R), green (G) and blue (B) sub-pixel areas,
   wherein the red (R) sub-pixel area has a wire grid pattern with a period (P) of 270 nm, a height (H) of 220 nm, and a duty cycle of 0.3, the green (G) sub-pixel area has a wire grid pattern with a period (P) of 200 nm, a height (H) of 165 nm, and a duty cycle of 0.4, and the blue (B) sub-pixel area has a wire grid pattern with a period (P) of 140 nm, a height (H) of 150 nm, and a duty cycle of 0.4.

2. The polarizer according to claim 1, wherein the wire grid patterns have an array structure parallel to a boundary surface partitioning the sub-pixel areas.

3. The polarizer according to claim 1, wherein the wire grid patterns have an array structure perpendicular to a boundary surface partitioning the sub-pixel areas.

4. The polarizer according to claim 1, wherein the wire grid patterns are formed by patterning a conductive material in a wire grid shape on a glass substrate of a transparent material.

5. The polarizer according to claim 1, wherein the wire grid patterns are formed by repeatedly imprinting a stamp on imprinting resin using the stamp formed with the wire grid pattern of a different shape by a unit of a sub-pixel, a pixel or a pixel group, while the imprint resin containing a conductive material is formed on a substrate.

6. The polarizer according to claim 1, wherein the wire grid patterns are formed through a lithography process of laser interference by sequentially applying a plurality of masks opened or closed for each sub-pixel area, while a photo-resist layer is formed on a substrate.

7. The polarizer according to claim 1, wherein the wire grid patterns are formed by forming a wire grid pattern of a different shape for each sub-pixel area on a photo-resist layer using E-beams, forming the wire grid pattern by etching the conductive material using the photo-resist formed with the wire grid pattern as a mask, and removing remaining photo-resist, while a conductive material layer and the photo-resist layer are sequentially stacked on a substrate.

8. A liquid crystal panel comprising:
   a thin film transistor (TFT) substrate;
   a color filter substrate disposed to be opposite to the TFT substrate; and
   a liquid crystal layer interposed between the TFT substrate and the color filter substrate, the liquid crystal panel including a wire grid polarizer having a plurality of areas corresponding to red (R), green (G) and blue (B) sub-pixels of the color filter substrate,
   wherein the red (R) sub-pixel area has a wire grid pattern with a period (P) of 270 nm, a height (H) of 220 nm, and a duty cycle of 0.3, the green (G) sub-pixel area has a wire grid pattern with a period (P) of 200 nm, a height (H) of 165 nm, and a duty cycle of 0.4, and the blue (B) sub-pixel area has a wire grid pattern with a period (P) of 140 nm, a height (H) of 150 nm, and a duty cycle of 0.4.

9. The liquid crystal panel according to claim 8, wherein the wire grid polarizer is disposed under the liquid crystal layer.

10. The liquid crystal panel according to claim 9, further provided with a polarizing plate between the liquid crystal layer and the wire grid polarizer.

11. The liquid crystal panel according to claim 8, wherein the wire grid polarizer is disposed over the liquid crystal layer.

12. The liquid crystal, panel according to claim 8, wherein the wire grid patterns have an array structure parallel to a boundary surface partitioning the sub-pixel areas.

13. The liquid crystal panel according to claim 8, wherein the wire grid patterns have an array structure perpendicular to a boundary surface partitioning the sub-pixel areas.

14. The liquid crystal panel according to claim 8, wherein a wire width of the wire grid patterns of each color of the sub-pixels is formed to have a size of R>G>B.

15. The liquid crystal panel according to claim 8, wherein a wire height of the wire grid patterns of each color of the sub-pixels is formed to have a height of R>G>B.

16. A liquid crystal display device comprising:
   a display unit including a liquid crystal panel provided with a thin film transistor (TFT) substrate, a color filter substrate disposed to be opposite to the TFT substrate, and a liquid crystal layer interposed between the TFT substrate and the color filter substrate; and
   a backlight unit for generating light and providing the display unit with the light,
   wherein the liquid crystal display device includes a wire grid polarizer having a plurality of areas corresponding to red (R), green (G) and blue (B) sub-pixels of the color filter substrate, and
   wherein the red (R) sub-pixel area has a wire grid pattern with a period (P) of 270 nm, a height (H) of 220 nm, and a duty cycle of 0.3, the green (G) sub-pixel area has a wire grid pattern with a period (P) of 200 nm, a height (H) of 165 nm, and a duty cycle of 0.4, and the blue (B) sub-pixel area has a wire grid pattern with a period (P) of 140 nm, a height (H) of 150 nm, and a duty cycle of 0.4.

17. The liquid crystal panel according to claim 16, wherein the wire grid polarizer is disposed under the liquid crystal layer.

18. The liquid crystal panel according to claim 17, further provided with a polarizing plate between the liquid crystal layer and the wire grid polarizer.

19. The liquid crystal panel according to claim 16, wherein the wire grid polarizer is disposed over the liquid crystal layer.

20. The liquid crystal panel according to claim 16, wherein the wire grid patterns have an array structure parallel to a boundary surface partitioning the sub-pixel areas.

21. The liquid crystal panel according to claim 16, wherein the wire grid patterns have an array structure perpendicular to a boundary surface partitioning the sub-pixel areas.

22. The liquid crystal panel according to claim 16, wherein a wire width of the wire grid patterns of each color of the sub-pixels is formed to have a size of R>G>B.

23. The liquid crystal panel according to claim 16, wherein a wire height of the wire grid patterns of each color of the sub-pixels is formed to have a height of R>G>B.

* * * * *